(12) United States Patent
Miller et al.

(10) Patent No.: US 11,392,389 B2
(45) Date of Patent: Jul. 19, 2022

(54) SYSTEMS AND METHODS FOR SUPPORTING BIOS ACCESSIBILITY TO TRADITIONALLY NONADDRESSABLE READ-ONLY MEMORY SPACE

(71) Applicant: Dell Products L.P., Round Rock, TX (US)

(72) Inventors: Xiaomei Miller, Round Rock, TX (US); Chih Yung Lai, Tpe (TW); Chia Chien Chuang, Tpe (TW)

(73) Assignee: Dell Products L.P., Round Rock, TX (US)

( * ) Notice: Subject to any disclaimer, the term of this patent is extended or adjusted under 35 U.S.C. 154(b) by 111 days.

(21) Appl. No.: 16/869,262

(22) Filed: May 7, 2020

(65) Prior Publication Data

US 2021/0349727 A1 Nov. 11, 2021

(51) Int. Cl.
*G06F 9/4401* (2018.01)
*G06F 21/57* (2013.01)
*G06F 12/02* (2006.01)
*G06F 13/42* (2006.01)

(52) U.S. Cl.
CPC ........ *G06F 9/4401* (2013.01); *G06F 12/0246* (2013.01); *G06F 13/4282* (2013.01); *G06F 21/572* (2013.01)

(58) Field of Classification Search
CPC .............. G06F 9/4401; G06F 12/0246; G06F 13/4282; G06F 21/572
See application file for complete search history.

(56) References Cited

U.S. PATENT DOCUMENTS

2013/0138866 A1* 5/2013 Asfur ................... G06F 12/02 711/103
2018/0293187 A1* 10/2018 Radhakrishnan ..... G06F 9/4401

\* cited by examiner

*Primary Examiner* — Gary Collins
(74) *Attorney, Agent, or Firm* — Jackson Walker L.L.P.

(57) ABSTRACT

An information handling system may include a processor and a read-only memory communicatively coupled to the processor and comprising a basic input/output system (BIOS)-accessible region of the read-only memory including a first subregion communicatively coupled to the processor via a first communications interface and a second subregion communicatively coupled to the processor via a second communications interface. The information handling system may also include the BIOS, configured to responsive to a read request from the processor to the BIOS-accessible region determine whether a memory address associated with the read request is within a decoding range of the first subregion, cause the processor to access the first subregion via the first communications interface if the memory address is within the decoding range, and cause the processor to access the second subregion via the second communications interface if the memory address is outside the decoding range.

12 Claims, 2 Drawing Sheets

SYSTEMS AND METHODS FOR SUPPORTING BIOS ACCESSIBILITY TO TRADITIONALLY NONADDRESSABLE READ-ONLY MEMORY SPACE

TECHNICAL FIELD

The present disclosure relates in general to information handling systems, and more specifically to supporting accessibility of a basic input/output system (BIOS) of an information handling system to read-only memory (ROM) space that is traditionally nonaddressable by BIOS.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A key component of many information handling systems is a basic input/output system (BIOS). A BIOS, which may include a Unified Extensible Firmware Interface (UEFI), may identify, test, and/or initialize information handling resources of an information handling system 102. In particular, a BIOS may comprise boot firmware configured to be the first code executed by a processor of an information handling system when the information handling system is booted and/or powered on. As part of its initialization functionality, BIOS code may be configured to set components of the information handling system into a known state, so that one or more applications (e.g., an operating system or other application programs) stored on compatible media may be executed by the processor and given control of the information handling system.

In many implementations, a BIOS may be able to access a read-only memory (ROM) for storing executable shell components of the BIOS, BIOS recovery components, BIOS backup images, debugging information, telemetry data, and/or other information. However, in traditional implementations, a chipset decoding range for BIOS-accessible ROM may be limited (e.g., limited to 16 megabytes of addressable space). Increasingly, BIOS-accessible ROMs are increasing in size, as such ROMs are also being used by other components of information handling systems, such as management engines, Gigabit Ethernet, embedded controllers, and other components, which are given their own dedicated regions in ROM.

For example, FIG. 4 depicts an example layout for a BIOS-accessible ROM 6, as is known in the art. As shown in FIG. 4, BIOS-accessible ROM 6 may include a BIOS region 2 limited in size (e.g., 16 megabytes) due to chipset decoding range limitations, a special-purpose region 4 that may be reserved for other information handling system components (e.g., management engine, Gigabit Ethernet, embedded controller), and a region 8 (e.g., of 8 megabytes in size) that may go unused because it is not needed by components using special-purpose region 4 and cannot be addressed by BIOS.

SUMMARY

In accordance with the teachings of the present disclosure, the disadvantages and problems associated with accessibility to ROM memory space by a BIOS may be reduced or eliminated.

In accordance with embodiments of the present disclosure, an information handling system may include a processor and a read-only memory communicatively coupled to the processor and comprising a basic input/output system (BIOS)-accessible region of the read-only memory including a first subregion communicatively coupled to the processor via a first communications interface and a second subregion communicatively coupled to the processor via a second communications interface. The information handling system may also include the BIOS, configured to responsive to a read request from the processor to the BIOS-accessible region determine whether a memory address associated with the read request is within a decoding range of the first subregion, cause the processor to access the first subregion via the first communications interface if the memory address is within the decoding range, and cause the processor to access the second subregion via the second communications interface if the memory address is outside the decoding range.

In accordance with these and other embodiments of the present disclosure, a method may include determining, by a basic input/output system (BIOS) of an information handling system, whether a memory address associated with a read request from a processor to a BIOS-accessible region of a read-only memory of the information handling system is within a decoding range of a first subregion of the BIOS-accessible region. The method may also include causing the processor to access the first subregion via a first communications interface if the memory address is within the decoding range and causing the processor to access a second subregion of the BIOS-accessible region via a second communications interface if the memory address is outside the decoding range.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to determine, by a basic input/output system (BIOS) of an information handling system, whether a memory address associated with a read request from a processor to a BIOS-accessible region of a read-only memory of the information handling system is within a decoding range of a first subregion of the BIOS-accessible region. The instructions may further cause the processor to access the first subregion via a first communications interface if the memory address is within the decoding range and access a second subregion of the BIOS-accessible region via a second communications interface if the memory address is outside the decoding range.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more busses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), busses, memories, I/O devices and/or interfaces, storage resources, network interfaces, motherboards, and/or any other components and/or elements of an information handling system.

Figure 1:
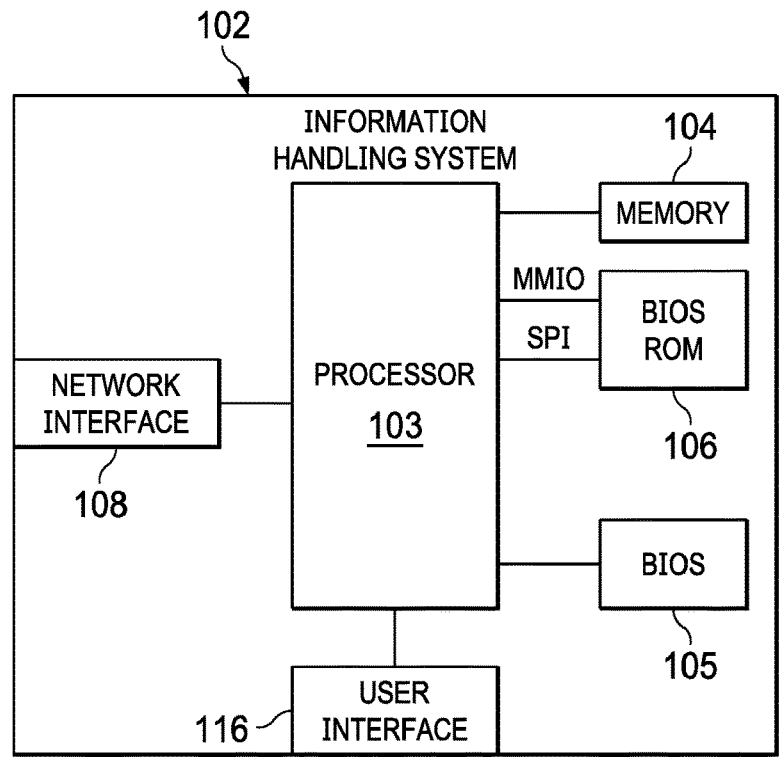
FIG. 1 illustrates a block diagram of an example information handling system, in accordance with certain embodiments of the present disclosure.

FIG. 1 illustrates a block diagram of an example information handling system 102, in accordance with certain embodiments of the present disclosure. In some embodiments, information handling system 102 may be a server. In other embodiments, information handling system 102 may be a personal computer (e.g., a desktop computer or a portable computer). As depicted in FIG. 1, information handling system 102 may include a processor 103, a memory 104 communicatively coupled to processor 103, a basic input/output system (BIOS) 105 communicatively coupled to processor 103, a BIOS-accessible ROM 106 communicatively coupled to processor 103, a network interface 108 communicatively coupled to processor 103, and a user interface 116 coupled to processor 103.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, BIOS-accessible ROM 106, BIOS 105, and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

BIOS 105 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, BIOS 105 code may be configured to set components of information handling system 102 into a known state, so that one or more applications (e.g., an operating system or other application programs) stored on compatible media (e.g., memory 104) may be executed by processor 103 and given control of information handling system 102.

BIOS-accessible ROM 106 (which may also be referred to herein as BIOS ROM 106) may be communicatively coupled to processor 103 and may include any system, device, or apparatus configured to retain program instructions or data for a period of time (e.g., a computer-readable medium). In some embodiments, BIOS-accessible ROM 106 may include a hard disk drive, a solid state storage drive, a flash drive and/or any other suitable computer-readable medium.

As shown in FIG. 1, BIOS ROM 106 may be coupled to processor 103 via a memory-mapped input/output (MMIO) interface and via a serial peripheral interface (SPI) (including without limitation an enhanced Serial Peripheral Interface (eSPI)). As described in greater detail below, processor 103 may be configured to access certain regions of BIOS ROM 106 via the MMIO interface and access other certain regions of BIOS ROM 106 via the SPI.

An example layout of the memory space of BIOS ROM 106 is set forth in FIG. 2, described in greater detail below.

Network interface 108 may comprise any suitable system, apparatus, or device operable to serve as an interface between information handling system 102 and a network comprising one or more other information handling systems. Network interface 108 may enable information handling system 102 to communicate over such a network using any suitable transmission protocol and/or standard, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network interface 108 may interface with one or more networks implemented as, or as part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). In certain embodiments, network interface 108 may comprise a network interface card, or "NIC."

User interface 116 may comprise any instrumentality or aggregation of instrumentalities by which a user may interact with information handling system 102. For example, user interface 116 may permit a user to input data and/or instructions into information handling system 102 (e.g., via a keyboard, pointing device, and/or other suitable component), and/or otherwise manipulate information handling system 102 and its associated components. User interface 116 may also permit information handling system 102 to communicate data to a user, e.g., by way of a display device.

Figure 2:
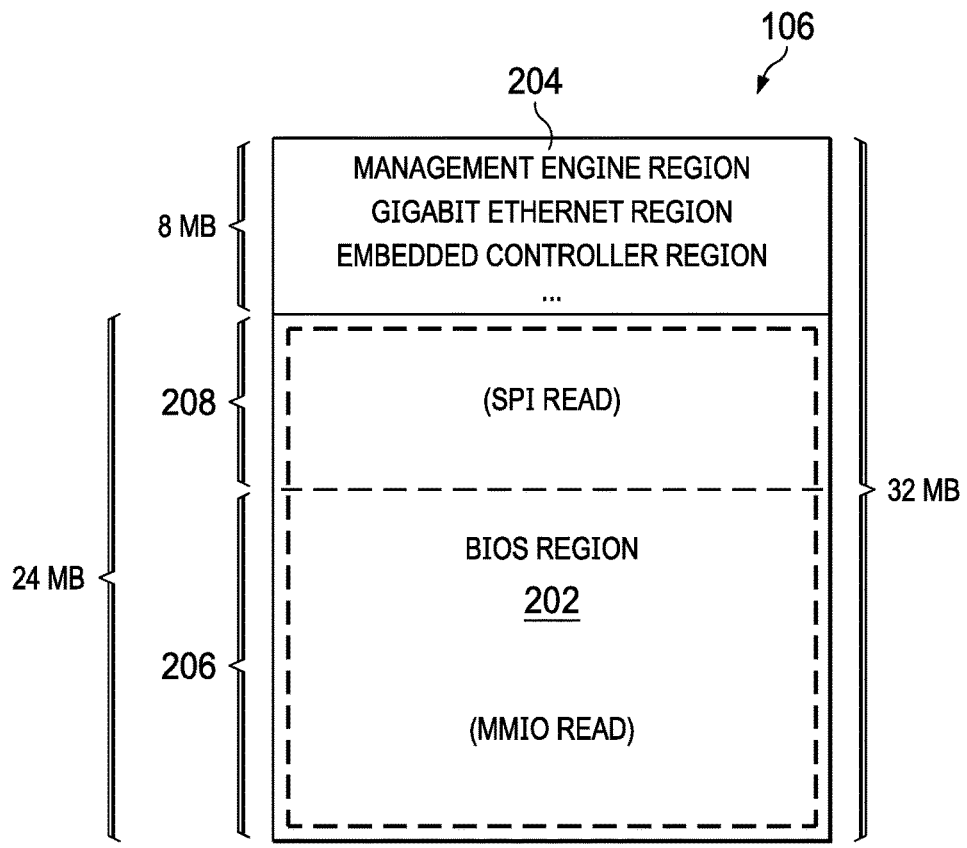
FIG. 2 illustrates a block diagram of regions of a BIOS-accessible ROM, in accordance with certain embodiments of the present disclosure.

FIG. 2 illustrates a block diagram of regions of a BIOS-accessible ROM 106, in accordance with certain embodiments of the present disclosure. As shown in FIG. 2, BIOS ROM 106 (e.g., 32 megabytes in size) may include a BIOS region 202 (e.g., 24 megabytes in size) and special-purpose region 204 that may be reserved for other information handling system components (e.g., management engine, Gigabit Ethernet, embedded controller). As shown in FIG. 2, BIOS region 202 may be further divided into an MMIO read subregion 206 (e.g., 16 megabytes in size) having memory space supported (e.g., addressable) by the chipset decoding range for BIOS 105 and an SPI read subregion 208 (e.g., 8 megabytes in size) outside the chipset decoding range for BIOS 105.

In operation, BIOS 105 may be configured to access SPI read subregion 208 outside the chipset decoding range using SPI, while also being configured to access MMIO read subregion 206 using MMIO. Thus, such approach allows for expanded BIOS 105 access to BIOS ROM 106 as compared with existing approaches.

Figure 3:
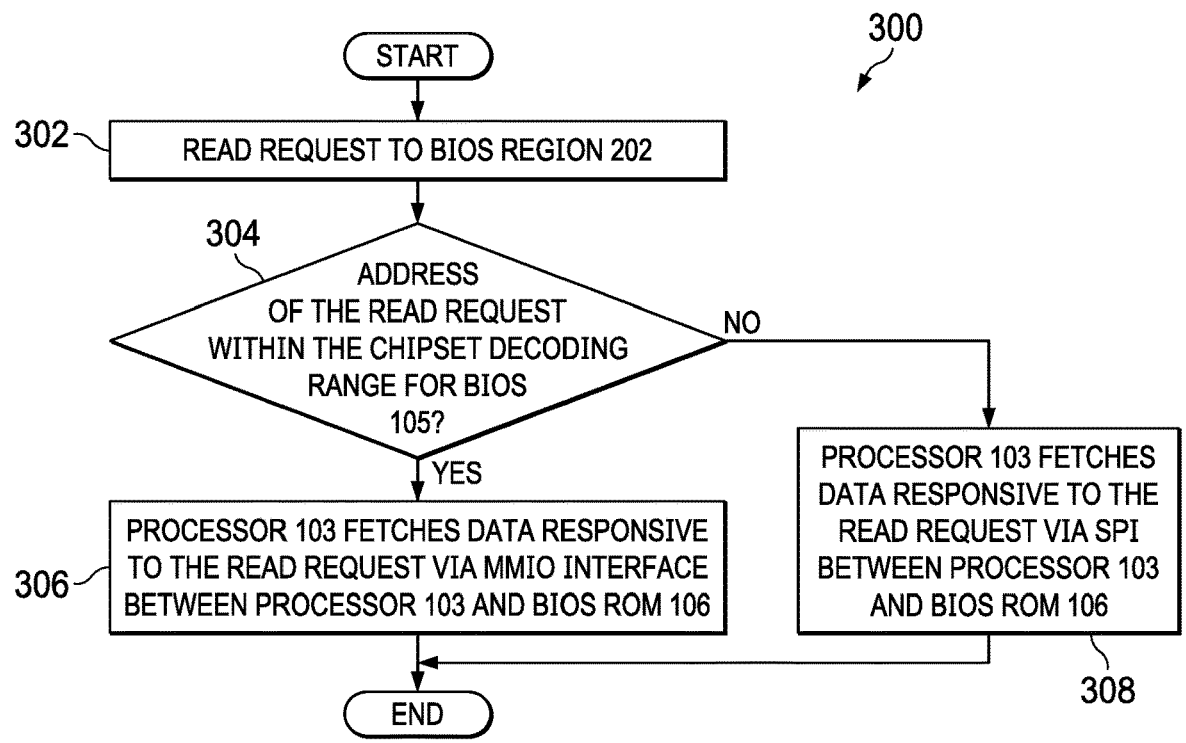
FIG. 3 illustrates a flow chart of an example method for supporting BIOS accessibility to traditionally nonaddressable ROM space, in accordance with embodiments of the present disclosure.
Figure 4:
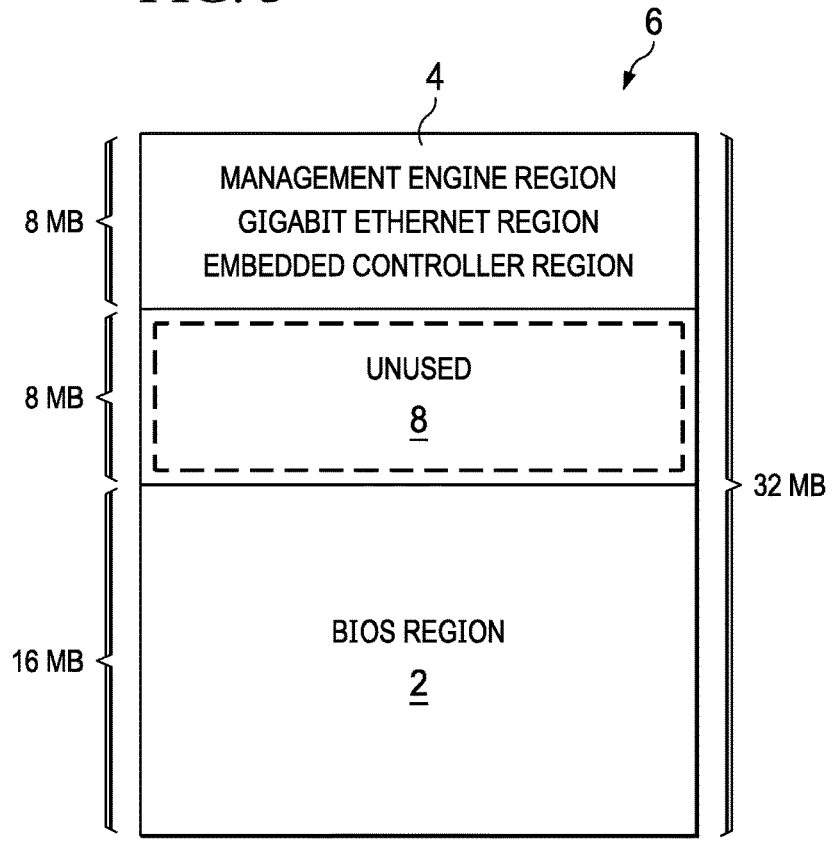
FIG. 4 depicts an example layout for a BIOS-accessible ROM 6, as is known in the art.

FIG. 3 illustrates a flow chart of an example method 300 for supporting BIOS accessibility to traditionally nonaddressable ROM space, in accordance with embodiments of the present disclosure. According to one embodiment, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, processor 103 may issue a read request to BIOS region 202. At step 304, responsive to the read request, BIOS 105 (e.g., a firmware boot loader of BIOS 105) may determine if an address of the read request is within the chipset decoding range for BIOS 105. If the address of the read request is within the chipset decoding range for BIOS 105, method 300 may proceed to step 306. Otherwise, method 300 may proceed to step 308.

At step 306, responsive to the address of the read request being within the chipset decoding range for BIOS 105, BIOS 105 may cause processor 103 to fetch data responsive to the read request via the MMIO interface between processor 103 and BIOS ROM 106. After step 306, method 300 may end.

At step 308, responsive to the address of the read request being outside the chipset decoding range for BIOS 105, BIOS 105 may cause processor 103 to fetch data responsive to the read request via the SPI between processor 103 and BIOS ROM 106. After step 308, method 300 may end.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a processor;
   a read-only memory communicatively coupled to the processor and comprising a basic input/output system (BIOS)-accessible region of the read-only memory, wherein the BIOS-accessible region includes:
      a first BIOS subregion communicatively coupled to the processor via a first communications interface; and
      a second BIOS subregion communicatively coupled to the processor via a second communications interface; and
   the BIOS configured to, responsive to a read request from the processor to the BIOS-accessible region:
      determine whether a memory address associated with the read request is within a decoding range of the first BIOS subregion;
      cause the processor to access the first BIOS subregion via the first communications interface if the memory address is within the decoding range; and
      cause the processor to access the second BIOS subregion via the second communications interface if the memory address is outside the decoding range.

2. The information handling system of claim 1, wherein the read-only memory further comprises a special-purpose region accessible to components of the information handling system other than a BIOS of the information handling system.

3. The information handling system of claim 1, wherein the first communications interface is a memory-mapped input/output interface.

4. The information handling system of claim 1, wherein the first communications interface is a serial peripheral interface.

5. A method comprising:
   determining, by a basic input/output system (BIOS) of an information handling system, whether a memory address associated with a read request from a processor to a BIOS-accessible region of a read-only memory of the information handling system is within a decoding range of a first BIOS subregion of the BIOS-accessible region;
   causing the processor to access the first BIOS subregion via a first communications interface if the memory address is within the decoding range; and
   causing the processor to access a second BIOS subregion of the BIOS-accessible region via a second communications interface if the memory address is outside the decoding range.

6. The method of claim 5, wherein the read-only memory further comprises a special-purpose region accessible to components of the information handling system other than a BIOS of the information handling system.

7. The method of claim 5, wherein the first communications interface is a memory-mapped input/output interface.

8. The method of claim 5, wherein the first communications interface is a serial peripheral interface.

9. An article of manufacture comprising:
   a non-transitory computer-readable medium; and
   computer-executable instructions carried on the computer-readable medium, the instructions readable by a processor, the instructions, when read and executed, for causing the processor to:
      determine, by a basic input/output system (BIOS) of an information handling system, whether a memory address associated with a read request from a processor to a BIOS-accessible region of a read-only memory of the information handling system is within a decoding range of a first BIOS subregion of the BIOS-accessible region;
      access the first BIOS subregion via a first communications interface if the memory address is within the decoding range; and
      access a second BIOS subregion of the BIOS-accessible region via a second communications interface if the memory address is outside the decoding range.

10. The article of claim 9, wherein the read-only memory further comprises a special-purpose region accessible to components of the information handling system other than a BIOS of the information handling system.

11. The article of claim 9, wherein the first communications interface is a memory-mapped input/output interface.

12. The article of claim 9, wherein the first communications interface is a serial peripheral interface.

\* \* \* \* \*